(12) United States Patent
Takaki et al.

(10) Patent No.: US 8,252,428 B2
(45) Date of Patent: Aug. 28, 2012

(54) HIGH-STRENGTH MEMBER FOR VEHICLE

(75) Inventors: Naoki Takaki, Wako (JP); Yoshitaka Okitsu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 303 days.

(21) Appl. No.: 12/792,945

(22) Filed: Jun. 3, 2010

(65) Prior Publication Data

US 2010/0310897 A1 Dec. 9, 2010

(30) Foreign Application Priority Data

Jun. 3, 2009 (JP) ................................. 2009-134506

(51) Int. Cl.
B32B 1/08 (2006.01)
B32B 15/18 (2006.01)
B32B 3/28 (2006.01)

(52) U.S. Cl. ........ 428/582; 428/595; 428/603; 428/683; 428/686

(58) Field of Classification Search .................. None
See application file for complete search history.

(56) References Cited

U.S. PATENT DOCUMENTS

| | | | |
|---|---|---|---|
| 6,221,179 B1 | 4/2001 | Yasuhara et al. | |
| 6,971,691 B1 | 12/2005 | Heatherington et al. | |
| 7,316,432 B2 | 1/2008 | Muskos | |
| 2008/0131305 A1* | 6/2008 | Okitsu | 420/106 |
| 2009/0188589 A1 | 7/2009 | Okitsu | |
| 2011/0008648 A1* | 1/2011 | Okitsu | 428/683 |

FOREIGN PATENT DOCUMENTS

| | | |
|---|---|---|
| DE | 10-2005-050235 A1 | 4/2007 |
| DE | 10-2007-056645 A1 | 5/2009 |
| JP | 62-182225 A | 8/1987 |
| JP | 07-188834 A | 7/1995 |
| JP | 11-152544 A | 6/1999 |
| JP | 2001-130444 A | 5/2001 |
| JP | 2001-287666 A | 10/2001 |
| JP | 2003-126922 A | 5/2003 |
| JP | 2006-116568 A | 5/2006 |
| JP | 2006-161077 A | 6/2006 |
| JP | 2007-062657 A | 3/2007 |
| JP | 2007-321207 A | 12/2007 |
| WO | WO 2007/138752 | * 12/2007 |

OTHER PUBLICATIONS

German Office Action dated Feb. 23, 2011, issued in corresponding Germany Patent Application No. 102010029654.6.
Japanese Office Action dated Dec. 20, 2011, issued in corresponding Japanese Patent Application No. 2009-134506.

* cited by examiner

*Primary Examiner* — John J Zimmerman
(74) *Attorney, Agent, or Firm* — Westerman, Hattori, Daniels & Adrian, LLP (57) ABSTRACT

A high-strength steel sheet having high strength and ability to absorb impact energy to a high degree is formed into a strengthening member for an vehicle, having both superior energy absorption efficiency and bonding properties. The high-strength member has a high-strength steel sheet having not less than 5000 MPa of gradient du/de of a stress-strain diagram in a range of 3 to 7% of true strain obtained in a tension test, and a steel sheet having 0.3 to 0.85 of tension strength ratio against tension strength of the high-strength steel sheet, the steel sheets bonded at their ends with space extending in a prescribed direction between the steel sheets, and a load is to be applied on the member from the prescribed direction when the member is acted upon.

8 Claims, 7 Drawing Sheets

HIGH-STRENGTH MEMBER FOR VEHICLE

BACKGROUND OF THE INVENTION

1. Technical Field

The present invention relates to a high-strength member for vehicles, the high-strength member including a high-strength steel sheet having high strength and ability to absorb impact energy to high degrees.

2. Background Art

Recently, requirements for crash safety in vehicles have been increased. For example, as a safety measure for frontal collisions, a method in which the front frame is deformed to absorb energy, whereas deformation of the interior passenger space is minimized by high deformation resistance to maintain the space, is regarded as effective. In this method, the amount of energy absorption of the front frame is proportional to a product of the deformation resistance and deformation stroke. If a similar level of energy absorption were accomplished by a shorter deformation stroke, various benefits, such as improvement in motion performance and weight reduction of the vehicle body by a shortened front overhang, can be obtained. Therefore, recently, strengths of materials used in the front frame (generally, steel sheets) have been increased.

In order to increase the strength of the steel sheet for a front frame, since yield point is inevitably increased in the case in which the strength of the steel sheet is increased, it is therefore necessary to consider that initial reactive force, that is, reactive force at the moment of collision of the vehicle body, can also be greatly increased. Therefore, it is necessary that the initial reactive force be extremely minimized and that the absorption energy during deformation be sufficiently maintained.

Furthermore, under circumstances in which a part, such as a front frame, is compressed along its longitudinal direction, in the case in which strength of the steel sheet in increased, a buckled shape generally becomes unstable, and a mode of deformation changes from a stable shape buckled in the shape of a accordion to a bent condition. Obviously, since absorption efficiency of impact energy is decreased in the bent condition, improvement of absorption energy by strengthening the material cannot be anticipated in that case. As a reason that buckling becomes unstable by strengthening the steel sheet, it is mainly thought that work-hardening ability is decreased by strengthening the steel sheet material. That is, in the case in which degree of work-hardening of the material is high when the member is buckled once in the axial direction, deformation is dispersed not only to the initial buckled portion, but also to its surrounding region, another region is subsequently buckled, and as a result, a buckled form having an accordioned shape is obtained. However, in the case in which the degree of work-hardening of the material is low, deformation is concentrated at the initial buckled portion, and as a result, a bent form is obtained. Since work-hardening ability is generally decreased by strengthening the steel sheet, it has been inevitable that the buckling would be destabilized.

To solve such a problem, it is effective for the shape of the part to be formed so as to buckle stably. However, there is a limitation from the viewpoints of layout and design in an engine compartment, and a part having a desirable shape is not always used. Therefore, if a property of the material itself can be optimized to accomplish this purpose, it becomes possible for energy to be absorbed while strengthening the material without problems. Practically, if a steel sheet having high strength, low yield strength, and high work-hardening ability is used, increase of initial reactive force can be suppressed, buckling can be stabilized, and impact energy can be efficiently absorbed.

Furthermore, in a component part for an vehicle body such as the front frame, the part rarely consists of only one kind of steel sheet; most of the parts generally consist of at least two kinds of steel sheets or even more than two kinds. This is because comprehensive optimization has been promoted from the viewpoint of bonding properties, weight reduction, production cost and the like. Therefore, bonding of different materials is basically performed in the part for an vehicle body, and a requirement in which a bonding region of the materials of the parts does not break away when there is a collision is often specified as one of the requirements for crash safety in vehicles. A reason for avoiding the breaking is that desired absorption efficiency of impact energy is decreased by the breaking of the component materials. Occurrence or non-occurrence of breaking depends on bonding conditions, and the factor that is the most influential in selected bonding conditions is the kind of steel sheet. Therefore, in the case in which a component part for an vehicle body consisting of two or more kinds of steel sheet is designed, it is an important factor to select the kind of steel sheet.

As a steel sheet for a part for an vehicle body having superior collision properties, a steel sheet in which an austenite structure, possibly generating martensite by work-induced transformation and in which a steel sheet having a work hardening coefficient of not less than 0.6 is used, is disclosed (See Reference 1). In addition, a process for production of high-strength steel sheets having superior ductility, in which a steel having C: 0.1 to 0.45% and Si: 0.5 to 1.8% is hot-rolled, cold-rolled and annealed in prescribed conditions to obtain a steel having a tension strength of 82 to 113 kgf/mm$^2$ and having a product of tension strength and extension of not less than 2500 kgf/mm$^2$·% is disclosed (See Reference 2). Furthermore, a process for production for a high-strength steel sheet having high ductility, in which a composition having C: 0.1 to 0.4 wt % and suppressing Si is increased with a Mn amount and annealed twice in prescribed conditions to obtain a steel having a tension strength of 811 to 1240 MPa and having a product of tension strength and extension of not less than 28000 MPa·% is disclosed (See Reference 3).

Each reference mentioned above is a Japanese Unexamined Patent Application Publication, numbered as follows.
Reference 1: No. 2001-130444
Reference 2: No. Showa 62 (1987)-182225
Reference 3: No. Heisei 07 (1995)-188834.
Reference 4: No. 2007-321207

SUMMARY OF THE INVENTION

The reference 1 discloses an austenite type stainless steel sheet having Cr: 19 wt % and Ni: 12.2 wt % as Example a, and an austenite type stainless steel sheet having Cr: 18.3 wt % and Ni: 8.87 wt % as Example b. Using commercially available SUS304L (austenite type stainless steel) having almost the same components as in the Example b, the present inventors prepared a cylindrical member (See FIG. 3) in which the sheet material was bent to form a cross-sectionally hat-shaped (cross-sectionally flattened-D-shaped) member, to be used as a test piece. As a result of the crushing tests (See Examples below) of the test piece, buckling was generated stably in an accordion shape; however, there was no significant difference between the balance of initial reactive force and absorbed energy in the test piece steel, and that of the conventional steel.

Furthermore, claim 2 of the Reference 1 defines the work hardening coefficient of the steel sheet as being not less than 0.26; however, the present inventors determined that the work hardening coefficient, that is, the "n value", is not the only factor which decides the balance of the initial reactive force and the absorption energy. Originally, the n value is a coefficient in the case in which the relationship of stress σ and strain ε is shown by "σ=Kεn". The present inventors think that there are three problems regarding this.

As the first problem, the n value itself merely determines a shape of a stress-strain diagram, and it does not determine an amount of work hardening of the material, that is, an absolute value of increment of deforming stress. For example, soft steel sheet has high n values; however, it does not always have large absolute values of increment of stress. In addition, the n value does not always fit to the stress-strain diagram of all of the materials. As mentioned below, the present invention is based on knowledge that an important factor in collision properties of a member is the increment of stress, that is, the gradient of the stress-strain diagram, not the n value.

As the second problem, when measuring the n value, resultant n values vary depending on the range of strain amount used in the measurement. For example, the Handbook of Difficulty of Press Forming, Third Edition, 2007, edited by the Workshop on Techniques for Forming Thin Steel Sheets, Nikkan Kogyo Shimbun, Ltd., p. 99, discloses that the "n value of an ordinary material is not constant during deformation". However, there is no significant requirement about the range of strain amount used in the measurement of n values. The above-mentioned Handbook of Difficulty of Press Forming, Third Edition, p. 99, merely discloses that "strain amount of an ordinary steel sheet is 5 to 15% or 10 to 20% in many cases". Furthermore, JIS (Japanese Industrial Standards) Z 2253, Testing method for work hardening coefficient of thin sheet metallic material, 7. Calculation of n value (1), discloses as follows: "A range of strain used in calculation depends on standards of each material. In the case in which there is no requirement in particular, it depends on agreement between parties of delivery". However, neither "JIS G 3141, Cold rolled steel sheet and steel band" nor "Japan Iron and Steel Federation Standards JFSA-2001, Cold rolled steel sheet and steel band for vehicles" disclose requirements of n values.

In view of the above-mentioned considerations, direct comparison of n values obtained by various methods does not constitute correct evaluation. Furthermore, when measuring n values, regions of elastic deformation should be handled carefully. In "JIS Z 2253, Testing method for work hardening coefficient of thin sheet metallic material", gauge mark length L of an extensometer is used as a definition of true strain ε. If, according to the disclosure, the true strain is calculated using displacement of the gauge mark length including the region of elastic deformation, the true strain inevitably includes portions of elastic deformation. However, there is inconsistency in use of the strain including the region of elastic deformation upon calculating the work hardening coefficient. In the case of a soft steel sheet or the like having relatively low yield point, it is not a serious problem whether the region of elastic deformation is included or not; however, in the high-strength steel sheet of the present invention, when used in a collision part, since the yield point is higher than that of a soft steel sheet, a difference between an n value including the region of elastic deformation and an n value not including it, cannot be ignored.

In view of the above-mentioned circumstances, the present inventors have researched an index having ease of use and clear calculation conditions, except for the n value, as a material factor influencing collision properties of a member. As a result, it was concluded that a gradient of true stress dσ/dε within the range of true strain 3 to 7% is the most effective in a true-stress-true-strain diagram using a plastic strain excluding regions of elastic deformation. Therefore, in the present invention, the gradient of stress dσ/dε is defined as the index for prescribing material properties. Details of the measuring method will be explained below.

Next, the Reference 2 discloses a high-strength steel sheet having a product of tension strength and extension of not less than 2500 kgf/mm²·%, and the Reference 3 discloses a high-strength steel sheet having good balance of strength and ductility and having a product of tension strength and extension of not less than 28000 MPa·%; however, neither steel sheet has a property in which initial reactive force is suppressed and absorption energy is maintained.

Furthermore, as mentioned above, most parts for an vehicle body generally used employing conventional steel sheet consist of not less than two kinds of steel sheets. For example, in the case in which a part consists of two kinds of steel sheets, one may be a steel sheet having tension strength of about 600 MPa and the other may be a steel sheet having lower tension strength. Ordinarily, strength of a cold rolled steel sheet is proportional to the amount of C contained; however, condition ranges of spot welding become narrower as the amount of C becomes greater. Therefore, conventionally, two kinds of steel sheets, each having mutually different strength, that is, a steel sheet having a large amount of C and a steel sheet having a small amount of C, are combined, to broaden the range of bonding conditions of constituent materials. In this way, productivity is improved, and as a result, the possibility of breaking away of the bonding region of the constituent materials is excluded. However, since absorption ability of impact energy of a cold rolled steel sheet conventionally employed in a part for vehicle body is proportional to initial reactive force, that is, proportional to strength of the steel sheet, there is therefore a tendency that the absorption ability of impact energy of the part mentioned above consisting of high-strength steel sheet and low-strength steel sheet is lower than the absorption ability of a part consisting of high-strength steel sheets. Therefore, it is necessary to construct a part for an vehicle body in which bonding property and production costs are optimized and in which absorption ability of impact energy of constituent steel sheets can be utilized maximally.

In view of the above-mentioned circumstances, a technique in which a high-strength steel sheet having sufficient ability to absorb impact energy and suppress initial reactive force as possible during a collision, can be applied to a part in an optimal condition of bonding property and production cost or the like without losing energy absorption efficiency of the steel sheet, has been required.

Therefore, an object of the present invention is to provide a strong member for an vehicle combining both high-strength and ability to absorb impact energy to a high degree.

The present inventors have researched properties of materials required to increase the amounts of energy absorbed while minimizing initial reactive force, particularly in a part which is deformed along an axial direction, among strength members for an vehicle body. As a result, it was obvious that the initial reactive force would be proportional to the stress when 3% of a material deformed, and the absorption energy after it was crushed would be proportional to the stress when 7% of the material deformed. In view of this, it was concluded that it would be necessary to decrease the 3% deforming stress of material as much as possible and to increase the 7% deforming stress of material as much as possible, to improve the absorption energy while suppressing the initial reactive force. That is, it was concluded that a high-strength steel sheet in which stress increases between 3 to 7% of strain, that is, a gradient of a stress-strain diagram is large, can have a balance of low initial reactive force and high absorption energy never previously obtained (the steel sheet hereinafter referred to as a "developed steel sheet"). In addition, regarding a case in which one steel sheet of a strength member for an vehicle body consisting of two kinds of steel sheets is the developed steel sheet, the inventors have researched the relationship of bonding properties of the other steel sheet and the constituent steel sheet, and energy absorption. As a result, it has become obvious that breaking away of the constituent materials does not occur, and that high ability to absorb impact energy can be obtained, in the case of a member consisting of the developed steel sheet and a steel sheet having relatively low strength, compared to the case of a member consisting of two of the same developed steel sheets. Furthermore, in the case in which a ratio of tension strength of a steel sheet to the tension strength of the developed steel sheet is within a certain range, it is obvious that particularly high ability to absorb impact energy can be obtained while suppressing the initial reactive force. Furthermore, although the strength member for vehicles of the present invention is formed by welding such a steel sheet, there is a possibility that it may be difficult to obtain sufficient welding strength by an ordinary spot welding in the case in which the amount of C is relatively high. Therefore, the inventors have discovered that friction stir welding is effective for bonding the steel sheets to each other at high strength.

The high-strength member for vehicles of the present invention was completed in view of the above-mentioned knowledge, and it is characterized in that the high-strength member has a high-strength steel sheet having not less than 5000 MPa of gradient $d\sigma/d\epsilon$ of stress-strain diagram in a range of 3 to 7% of true strain obtained in a tension test, and a steel sheet having 0.3 to 0.85 of a tension strength ratio against tension strength of the high-strength steel sheet, wherein these steel sheets are bonded at their ends having space extending in a prescribed direction between these steel sheets, and wherein a load is applied on the member from the prescribed direction upon using the member.

It is desirable that the high-strength steel sheet and the steel sheet be bonded by friction stir welding, to obtain sufficient welding strength.

As mentioned above, it is necessary that the high-strength steel sheet used in the present invention (hereinafter referred to as a "developed steel sheet") have gradient $d\sigma/d\epsilon$ in a stress-strain diagram within the range of 3 to 7% of true strain measured by a tension test being not less than 5000 MPa, in order to obtain high-strength and ability to absorb impact energy to a high degree. Hereinafter, a method for measuring the gradient $d\sigma/d\epsilon$ in a stress-strain diagram, which shows the properties of the developed steel sheet, is explained in detail.

A test piece is prepared from a material and the piece is applied to the tension test. At that time, an extensometer can be freely used. In the case in which the extensometer is used, gauge mark extension and load are measured in the tension test in order to obtain a nominal stress-strain diagram. Next, by subtracting an elastic deformation part, strain in the nominal stress-strain diagram is converted to plastic strain, and this is further converted to a relationship of true strain and true stress. From the plastic true-stress-true-strain diagram obtained, the true stress ($\sigma3$) at the true strain of 0.03 and the true stress ($\sigma7$) at the true strain of 0.07 are obtained. Then, a gradient $d\sigma/d\epsilon$ of a stress-strain diagram is obtained by the following formula:

$$d\sigma/d\epsilon=(\sigma7-\sigma3)/0.04$$

This formula is the gradient of a stress-strain diagram defined in the present invention.

In the case in which the extensometer cannot be used because the test piece is too small or the like, crosshead displacement and load are measured to obtain a stress-displacement diagram. Then, regarding a straight portion at a rising of a stress-displacement diagram as an elastic deformation part, the elastic deformation part is subtracted from strain, to obtain nominal plastic strain. The rest can be calculated in a manner similar to the above-mentioned.

In addition, the present inventors researched focusing on superminiaturization of crystal particles to obtain high-strength steel sheets in which work hardening property is greatly improved without depending on the above-mentioned technique. As a result, it was concluded that unprecedented high work hardening property can be exhibited in addition to the high strength, by preparing the complex structure steel sheet in which a constant ratio of hard second phase consisting of at least one or more of martensite, bainite and residual austenite is contained in a mother phase of ferrite containing superfine particles at a predetermined ratio.

Figure 1:
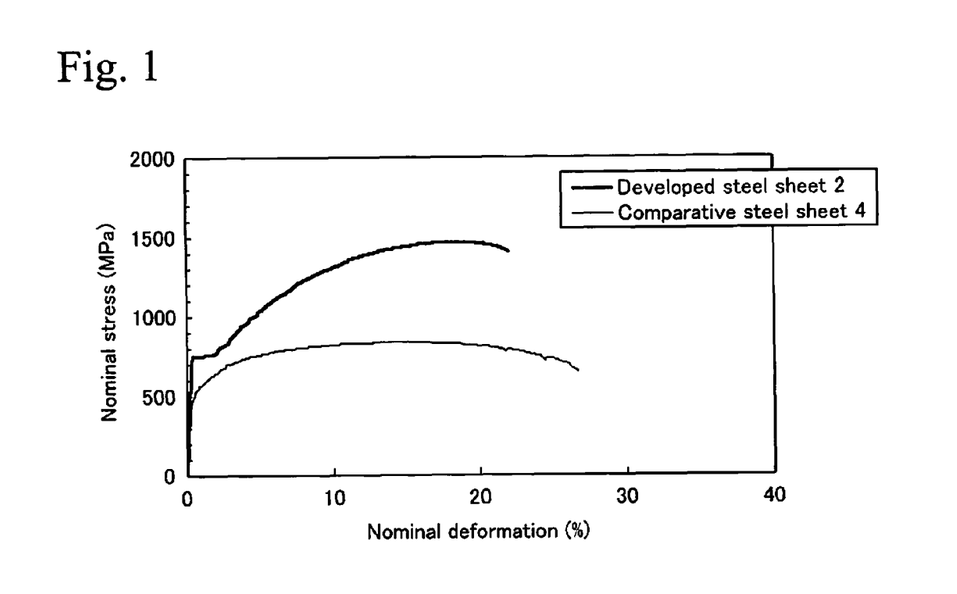
FIG. 1 is a graph showing the relationship between nominal stress and nominal deformation of steel sheets of developed steel sheets and comparative steel sheets in Examples.

The steel sheet produced in the way mentioned above is the developed steel sheet, and its gradient in a stress-strain diagram within the range of 3 to 7% of true strain is not less than 5000 MPa, which cannot be realized by a conventional technique for production of a high-strength steel sheet. FIG. 1 shows a nominal stress-nominal strain diagram of the developed steel sheet and a conventional cold rolled steel sheet (the developed steel sheet 2 and low strength comparative steel sheet 4 shown in Examples below). The developed steel sheet has a large work hardening property in a range of not more than 10% of strain in particular.

A reason that the structure of the developed steel sheet consisting of the ferrite phase of superfine particles and the hard second phase have unprecedented large work hardening property is not clear, but it is assumed to be as follows. That is, a displacement of a cell structure, which is generally observed in a deformed structure of metal, is not formed, and movable displacement density is low in the superfine ferrite particles. Furthermore, the work hardening property of the ferrite is large by preferentially deforming the soft ferrite adjacent to the structure of the hard second phase to induce high strain, that is, displacement in the ferrite phase.

Here, the displacement cell means that displacement parts induced by deforming are piled up while being trapped or intertwined with each other so as to be arranged to decrease strain energy, and the displacement cell consists of a part having high displacement density, called a "cell wall", and a part having relatively low displacement density. It is assumed that outer stress required to deform is lower compared to a case in which the cell is not formed, since the strain energy is decreased and inner stress is alleviated by forming the displacement cell in this way.

It should be noted that detailed explanation of work hardening phenomena and structures of the developed steel sheet are shown in the Reference 4.

Next, in order to obtain a necessary material structure in which bonding property and high absorption ability of impact energy are superior regarding a high-strength member for an vehicle consisting of one kind or two kinds of steel sheet, the present inventors have researched a relationship of breaking configuration and absorption ability of impact energy during a crash of the high-strength member for an vehicle. As a result, it was concluded that it will be necessary for the constituent steel sheets of member to follow each other and exhibit a stable accordion-shape buckling deformation as mentioned above, in order to obtain high ability to absorb impact energy.

Here, necessary properties in which the constituent steel sheets of the member are deformed while following each other is considered. One of the properties is that strength of the steel sheet is low. Since deformation resistance is lower and degree of freedom of deformation direction is greater during a crash as the strength decreases, the steel sheets follow each other and are deformed until the end. The other property is that bonding strength of the steel sheets is high. As the bonding strength increases, the steel sheets follow each other until the end without breaking away.

As a result of testing the ability to absorb impact energy of the member in which the developed steel sheet having high work hardening property and exhibiting stable accordion-shaped buckling deformation and a steel sheet having low strength to improve the ability of the steel sheets to follow each other in the high-strength member for an vehicle, compared to the case in which a member consisting of the same steel sheets is tested, it was obvious that a high ability to absorb impact energy can be obtained while suppressing the initial load. In addition, in the case in which the developed steel sheet having a relatively high amount of C is used in the present invention, it is clear that the member consisting of the developed steel sheet and a high-strength steel sheet having a relatively low amount of C used in the present invention, that is, a developed steel sheet having relatively low strength, can yield high ability to absorb impact energy.

Furthermore, since one of the properties to improve the ability of steel sheets to follow each other is strength of the steel sheet, the inventors focused on a relationship of tension stress of both steel sheets in a high-strength member for an vehicle in which the developed steel sheet and a steel sheet are bonded. As a result, in the case of the steel sheet having tension strength ratio of 0.3 to 0.85 against tension strength of the developed steel sheet, energy absorption ability is particularly high while suppressing initial reactive force.

First, in the case in which a steel sheet has a tension strength ratio of less than 0.3, that is, a steel sheet having extremely low strength is used as the partner of the developed steel sheet, the ability of the steel sheets to follow each other is improved, and a stable accordion-shaped buckling deformation can be obtained; however, since a steel sheet having extremely low strength does not contribute to the absorption ability of impact energy any longer, the initial reactive force of the entire member is deteriorated, and the resultant energy absorption amount would be the same as in a conventional technique. On the other hand, in the case in which a steel sheet has a tension strength ratio of not less than 0.3, the ability to absorb impact energy of a steel sheet itself would be increased in addition to improvement in the ability of the steel sheets to follow each other, and high energy absorption ability of the entire member can be obtained.

Next, in the case in which a steel sheet having a tension strength ratio of greater than 0.85, that is, a steel sheet having a relatively high strength, is used as the partner of the developed steel sheet, since the ability of the steel sheets to follow are not exhibited and a steel sheet having high strength exhibits deformation in a bent shape as mentioned above, high ability to absorb impact energy cannot be obtained. On the other hand, in the case in which a steel sheet having a tension strength ratio of not less than 0.85, loss of the ability to follow and bend deformation by the high-strength steel sheet is alleviated, and sufficiently high ability to absorb energy of the whole member can be obtained based on the ability to absorb impact energy by the developed steel sheet having high work hardening property.

Here, the high-strength member for an vehicle in which a steel sheet having high strength and a steel sheet having low strength are bonded, is generally designed from the viewpoints of bonding property, weight-reduction, production cost or the like. On the other hand, the high-strength member for an vehicle of the present invention is different from the conventional technique from the viewpoints that a steel sheet having low strength is used with the developed steel sheet for the purpose of improving the ability of constituent steel sheets to follow, and that the ability to absorb impact energy is improved despite a steel sheet having low strength being used. Furthermore, since a conventional steel sheet can be used as a part, not bonding developed steel sheets to each other, it is advantageous that the production cost of the member can be reduced.

Next, a method for bonding the developed steel sheet having a relatively high amount of C and a steel sheet, is explained. As mentioned above, the high-strength member for an vehicle of the present invention is a member in which the developed steel sheet having high work hardening property and the steel sheet are bonded by friction stir welding.

As a factor that affects welding properties, not only the above-mentioned amount of C, but equivalent amounts of C which takes into account effects of other elements should also be used, and an equivalent amount of C which takes into account Si, Mn, P, and S: Ceq (C+Mn/20+Si/40+4P+2S) is used. As is disclosed in "Nippon Steel Corporation's Technical Report No. 385 (October 2006), p. 38", the Ceq expressed by this formula is regarded as a factor which affects breaking configuration of spot welding beads; however, essentially, it is a factor deciding whether a break occurred based on a break in the bead or in the mother material, affecting notch sensitivity of a fused bead. Therefore, it can be used as a decision of breaking configuration of other than spot welding, for example, a fused welding method such as laser welding and arc welding, joints.

In the case in which the equivalent amount of C of the developed steel sheet is relatively high, there is a possibility that sufficient bonding strength will not be obtained even if the developed steel sheet and the steel sheet are bonded by an ordinary spot welding. If the bonding strength is not sufficient, the ability of the constituent steel sheets to follow will be lost, and the amount of energy absorbed will be decreased. On the other hand, in the present invention, sufficient bonding strength is maintained by bonding the developed steel sheet having relatively high equivalent amount of C and the steel sheet by friction stir welding. The friction stir welding (hereinafter referred to as FSW) can bond material of a steel sheet in a solid phase, not fusing it like in the spot welding or arc welding. Therefore, it can prevent toughness of the bonding part from being greatly deteriorated.

Upon producing the high-strength member by bonding the developed steel sheet and the steel sheet by FSW, it is necessary to consider conditions of FSW to obtain a strength member having superior energy absorbing properties. The FSW is a method in which a rod shaped stirring tool is contacted to the bonding part, and is moved along the bonding line, in order to bond the contacted part of the steel sheets to each other. In the FSW, amount of heat input from the tool to the steel sheet varies depending on rates of rotating and moving of the tool. This amount of heat input is an important factor from the viewpoint of bonding the steel sheets to each other efficiently.

In the case in which the amount of heat input is low, flowage of the steel sheet would be insufficient, and as a result, bonding would also be insufficient. On the other hand, in the case in which the amount of heat input is too high, temperature of the steel sheet would be over the A3 transformation point, and it is disadvantageous from the viewpoint of strength since a martensite phase having inferior toughness would be substantially formed by cooling after that. The amount of heat input is increased as the moving rate of the tool decreases and as the rotating rate of the tool increases. In addition, the moving rate of the tool affects the stability of bonding. That is, in the case in which the moving rate of the tool is low, bonding may be stable; however, the amount of heat input may be increased. On the other hand, in the case in which the moving rate of the tool is high, there may be deformation of the steel sheet being exfoliated, and defects may occur in the stirred part. To avoid these defects, the rotating and moving rates should be controlled within an appropriate range. In the case of performing shaping with a tool mentioned below, for example, the appropriate ranges are from about 100 to 300 rpm rotating rate and from about 60 to 100 mm/min moving rate of the tool. In addition, the material of the tool may affect the amount of heat input. In the present invention, WC (tungsten carbide) type superhard alloy or the like is desirable.

The high-strength member for vehicles of the present invention is a member made by bonding the high-strength steel sheet in which gradient dσ/dε of stress-strain diagram is not less than 500 MPa at a range of 3 to 7% of true strain obtained by a tension test, and the steel sheet in which a tension strength ratio against the high-strength steel sheet is in the range of 0.3 to 0.85. Therefore, the high-strength member for an vehicle of the present invention can be crushed in a stable buckling configuration accompanied by great improvement of work hardening property. Furthermore, the high-strength member for an vehicle of the present invention has superior crashworthiness, and combines both high-strength and absorption ability of impact energy in high dimension while improving bonding properties and reduced product cost. Since the present invention has such characteristics, large weight reduction by thinning of the member and therefore large improvement in fuel efficiency of the vehicle can be accomplished, which contributes to reduction of exhaust of $CO_2$. Furthermore, since high bonding strength is maintained by bonding the high-strength member with friction stir welding, it is desirable as a strength member for an vehicle.

BEST MODE FOR CARRYING OUT THE INVENTION

The high strength steel sheet (developed steel sheet) which constitutes the strength member for vehicles according to the present invention is a steel sheet having a composite structure which consists of a ferrite parent phase and a second hard phase, and can be made of ferrite based low alloy steel having a common component.

The steel having given components can be industrially produced by melting using a convertor or an electric furnace, and it can be produced in a laboratory using a vacuum melting furnace or an atmosphere melting furnace. When the steel is cast, ingot casting in batches can be used, and moreover, continuous casting, which has higher productivity, can also be applied. Produced slabs or ingots are rolled by a continuous hot rolling mill for thin sheets so as to form a hot rolled coil. In this case, the composite structures of ferrite and second hard phase can be formed by suitably controlling cooling patterns and coiling temperatures after the hot rolling according to alloy content. The hot rolled coil as formed above is cold-rolled, after oxide scale is removed from the surface thereof by acid pickling. Cold rolling rate in this case can be controlled within a suitable range according to space of the second hard phases in the hot rolling sheet. Subsequently, the steel sheet is annealed by various methods such as continuous annealing, box annealing, etc., and skin pass rolling is carried out to correct the shape thereof, as necessary, so as to be marketable.

As described above, the high strength steel sheet (developed steel sheet) which has an ultrafine composite structure in the present invention can be produced without changing conventional production processes of thin steel sheets merely by optimizing a structure of intermediate materials and process conditions.

In addition, one of the steel sheets which constitute a strength member for vehicles of the present invention is a commercial steel sheet for vehicles which has been marketed up until the present, and it is a steel sheet having a wide strength range such as a tensile stress of about 450 to 1,000 MPa, which is generally used in body parts for vehicles.

EXAMPLES

Next, specific Examples of the present invention will be explained. The Examples are made from steel sheets produced in the laboratory, apparatuses for vacuum melting, rolling, annealing, etc., in production, are smaller than apparatuses for mass-production, and production in mass-production apparatuses is not in any way limited by results of the Examples.

Slabs 1 to 3, having compositions shown in Table 1, were melted by vacuum melting, and then rolling and annealing processes were carried out while changing processing conditions, respectively, and therefore, the developed steel sheets 1 and 2 which were in the present invention and comparative steel sheet 1 which deviated from the range of the present invention were produced. Additionally, steel sheets 1 to 6 which were commercial materials having chemical compositions shown in Table 1 used as comparative steel sheets 2 to 7 which deviated from the range of the present invention. Furthermore, annealed structures of the developed steel sheets 1 and 2 and comparative steel sheets 1 to 7 are shown in Table 1. Here, the impurity other than elements shown in Table 1 is Fe.

TABLE 1

| | | Components (wt %) | | | | | | | | Anealed structure | |
| | | C | Si | Mn | P | S | Nb | Ni | Ceq | Primary phase | Secondary phase |
|---|---|---|---|---|---|---|---|---|---|---|---|
| Developed steel sheet 1 | Slab 1 | 0.20 | 0.01 | 3.00 | 0.003 | 0.003 | 0.050 | 0.01 | 0.368 | F | M, A |
| Developed steel sheet 2 | Slab 2 | 0.39 | 1.41 | 1.57 | 0.004 | 0.002 | 0.020 | 1.94 | 0.524 | F | B, A |
| Comparative steel sheet 1 | Slab 3 | 0.175 | 1.38 | 2.02 | 0.001 | 0.001 | | | 0.317 | M | — |
| Comparative steel sheet 2 | Commercial material 1 | 0.140 | 0.50 | 1.70 | 0.008 | 0.001 | 0.001 | 0.01 | 0.272 | F | M |
| Comparative steel sheet 3 | Commercial material 2 | 0.169 | 1.35 | 2.00 | 0.012 | 0.012 | 0.002 | | 0.375 | F | M |
| Comparative steel sheet 4 | Commercial material 3 | 0.091 | 0.03 | 1.98 | 0.008 | 0.002 | | | 0.227 | F | M |
| Comparative steel sheet 5 | Commercial material 4 | 0.087 | 0.79 | 1.77 | 0.009 | 0.002 | | | 0.235 | F | M |
| Comparative steel sheet 6 | Commercial material 5 | 0.093 | 0.02 | 1.26 | 0.012 | 0.005 | | | 0.215 | F | C |
| Comparative steel sheet 7 | Commercial material 6 | 0.002 | 0.01 | 0.17 | 0.012 | 0.007 | | | 0.073 | F | — |

F: ferrite, A: retained austenite, M: martensite, B: bainite, C: cementite.

The metallographic structures (ferrite, retained austenite, martensite, bainite, cementite, and pearlite) shown in Table 1 were judged as follows. That is, steel sheets after the rolling were cut, so that the cross section was parallel to a rolling direction, and then the cross section was etched by Nital liquid, etc., and therefore, the metallographic structures were judged by secondary electron images (hereinafter called SEM photographs) photographed at a magnification of 5000 times using a scanning electron microscope.

Figure 2:
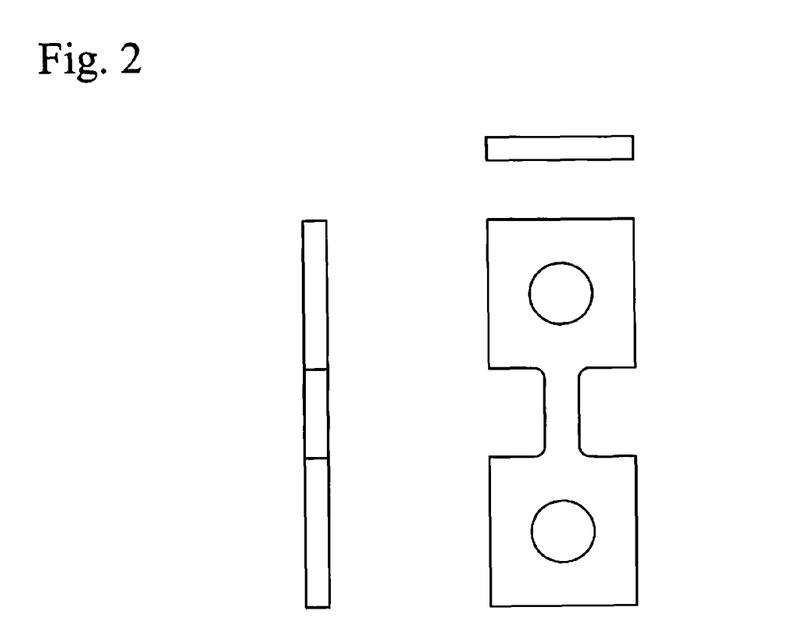
FIG. 2 is a schematic drawing showing a test piece used for tensile test in Examples.

Next, the developed steel sheets 1 and 2 and comparative steel sheets 1 to 7 shown in Table 1 were cut, so that the tensile axis was parallel to a rolling direction, and tensile test pieces in a dumb-bell shape as shown in FIG. 2 were produced. Then, tensile tests were carried out using the tensile test pieces, yield point (YP) and tensile strength (TS) were measured based on a stress deformation graph obtained by the test results, and furthermore, true stress at 3% true deformation, true stress at 7% true deformation, stress deformation gradient dσ/dε of true deformation 3 to 7%, and total elongation (t-El), were measured.

TABLE 2

| | | Material properties | | | | | |
| | | Yield stress (YS) MPa | Tensile stress (TS) MPa | True stress at 3% true deformation MPa | True stress at 7% true deformation MPa | Stress gradient (3-7%) MPa | Total elongation (t-El) % |
|---|---|---|---|---|---|---|---|
| Developed steel sheet 1 | Slab 1 | 698 | 1072 | 751 | 977 | 5650 | 28 |
| Developed steel sheet 2 | Slab 2 | 706 | 1309 | 811 | 1120 | 7725 | 21 |
| Comparative steel sheet 1 | Slab 3 | 840 | 1408 | 1337 | 1406 | 1725 | 11 |
| Comparative steel sheet 2 | Commercial material 1 | 1231 | 1290 | 1320 | 1253 | −1675 | 8 |
| Comparative steel sheet 3 | Commercial material 2 | 745 | 1017 | 1000 | 1089 | 2225 | 16 |
| Comparative steel sheet 4 | Commercial material 3 | 497 | 841 | 707 | 840 | 3325 | 27 |
| Comparative steel sheet 5 | Commercial material 4 | 380 | 603 | 507 | 600 | 2325 | 32 |
| Comparative steel sheet 6 | Commercial material 5 | 309 | 452 | 431 | 460 | 725 | 34 |
| Comparative steel sheet 7 | Commercial material 6 | 175 | 317 | 254 | 320 | 1650 | 51 |

FIG. 1 is a graph showing the relationship between nominal stress and nominal deformation of the developed steel sheet 2 and the comparative steel sheet 4, which are representative examples of stress deformation curves of the developed steel sheets and comparative steel sheets. As shown in FIG. 1, it is clear that the developed steel sheet has great work hardening property, in particular, at a region of deformation of 10% or less.

Figure 3:
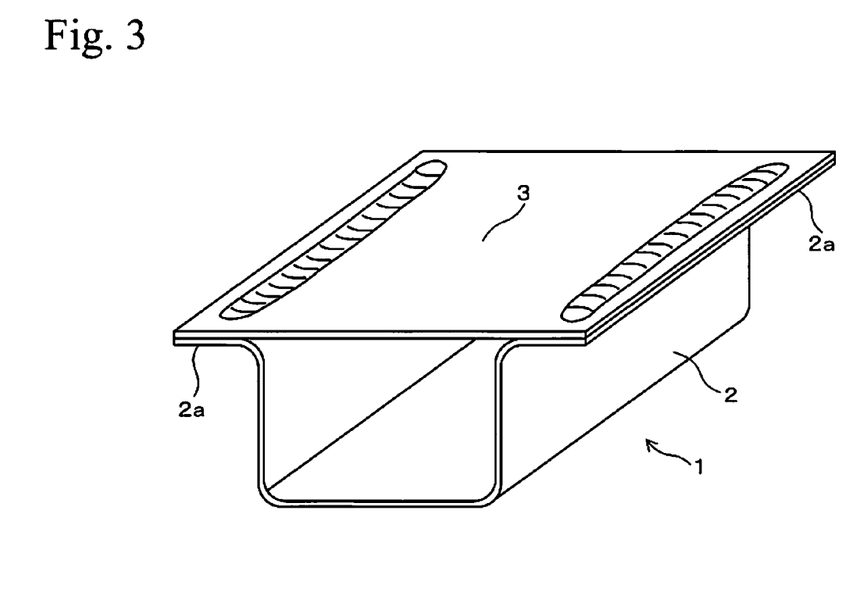
FIG. 3 is a perspective view showing a cylindrical member used in crushing tests in Examples.

Next, cylindrical member 1 (Example and Comparative Example) having a cross section in a rectangle shape shown in FIG. 3 was produced to be test piece, using the developed steel sheets 1 and 2 and the comparative steel sheets 1 to 7 shown in Table 2, respectively. The cylindrical member 1 was formed in a cylindrical shape by connecting plane back sheet 3 to flange 2a at a hat portion 2, in which the flange 2a was formed at both edges in a width direction by folding so as to have a cross section in a hat shape, and it was copied as a part of an vehicle frame (strength member for vehicles). At this time, each steel sheet of the developed steel sheets 1 and 2 and the comparative steel sheets 1 to 7 shown in Table 2 were used for a back sheet 3. Additionally, four rectangular bends at the hat portion 2 were formed by folding, using a punch having a radius of 5 mm.

Figure 4:
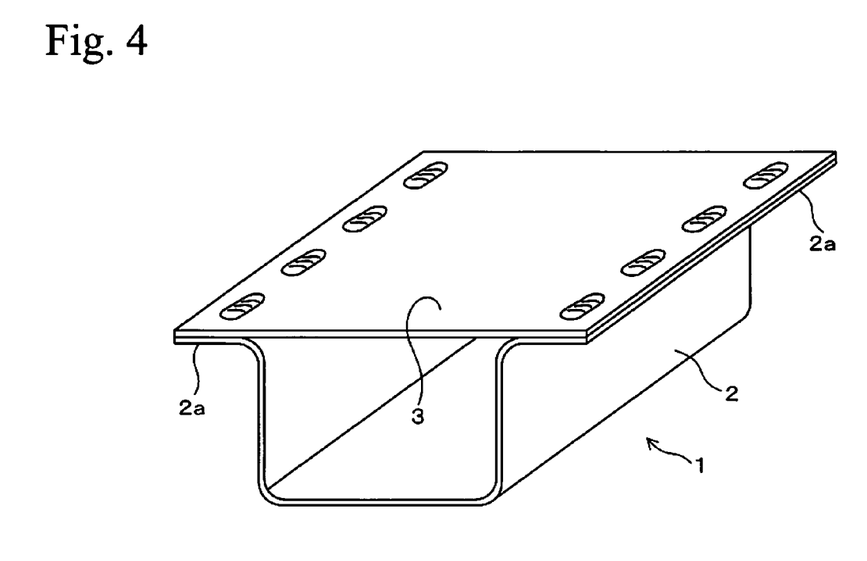
FIG. 4 is a perspective view showing a cylindrical member connected with a steel sheet in a stitched state by an FSW.

The cylindrical member 1 shown in FIG. 3 was produced by connecting the flange 2a with the back sheet 3 using a continuous FSW, and FIG. 4 shows the cylindrical member 1 connected in a stitched state. The FSW in this case connects the back sheet 3 with the flange 2a by moving them while pressing a connecting tool on the surface of the back sheet 3 corresponding to the flange 2a. Specifically, the tool used in FSW was made of cemented carbide based on WC (tungsten carbide) and had a shoulder diameter of 12 mm, and a diameter and a height of a protruded tip were 4 mm and 1.4 mm, respectively. Then, the FSW was carried out by rotating the tool at a fixed speed while tilting at 3 degrees from a perpendicular direction to the surface of the connected portion to a connecting direction (transferring direction), and by moving the tool in a connecting direction while pressing at a pressure of 2 to 3 tons. In addition, in a case in which the FSW is in a stitched state, each of four regions on the flange 2a and the back sheet 3 were connected while moving the tool every 6 mm so as to be in a stitched state.

Figure 5:
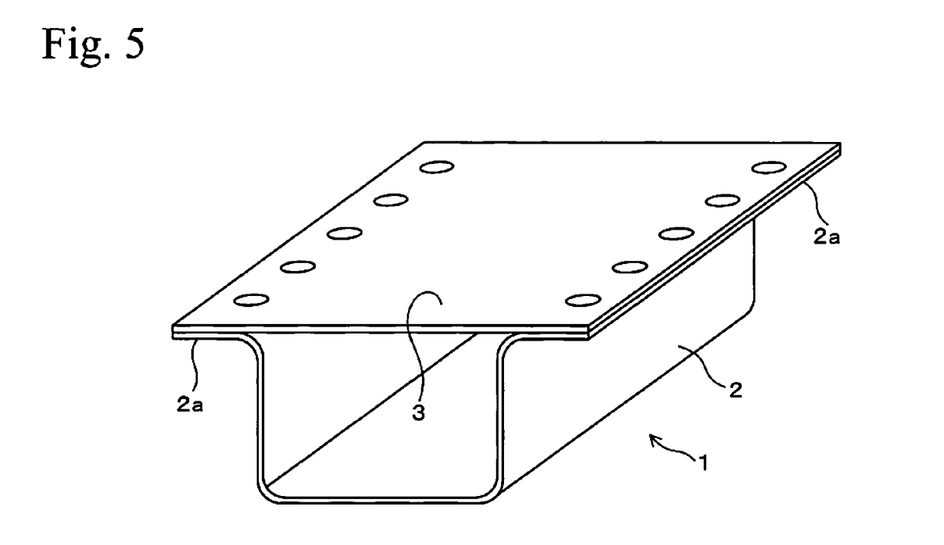
FIG. 5 is a perspective view showing a cylindrical member connected with a steel sheet by spot welding.

Furthermore, as is shown in FIG. 5, Comparative Examples were produced by connecting the flange 2a and the back sheet 3 using spot welding (five regions on both the right and left sides, respectively) as a connecting method except for the FSW.

Figure 6:
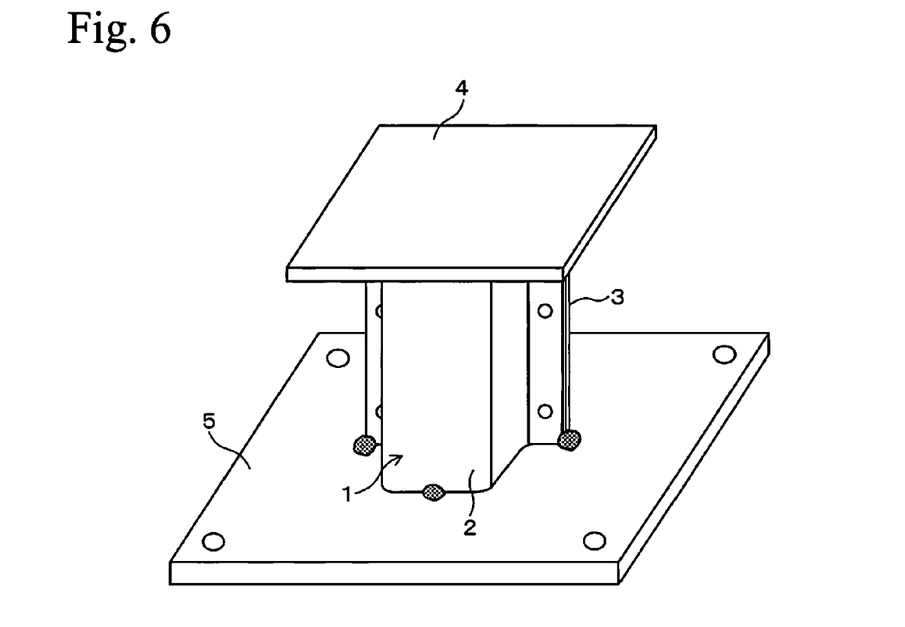
FIG. 6 is a perspective view showing a cylindrical member produced for a crushing test.

As described above, the cylindrical members 1 of each model shown in FIGS. 3 to 5 were produced using the developed steel sheets 1 and 2 and the comparative steel sheets 1 to 7, respectively, and next, as is shown in FIG. 6, crushed test members were produced by connecting a top sheet 4 and a bottom sheet 5 to both ends of these cylindrical members 1 using TIG welding. The top sheet 4 and the bottom sheet 5 were square steel sheets, and the area of the bottom sheet 5 was larger than that of the top sheet 4. The cylindrical member 1 was arranged at the center of the top sheet 4 and the bottom sheet 5.

Figure 7:
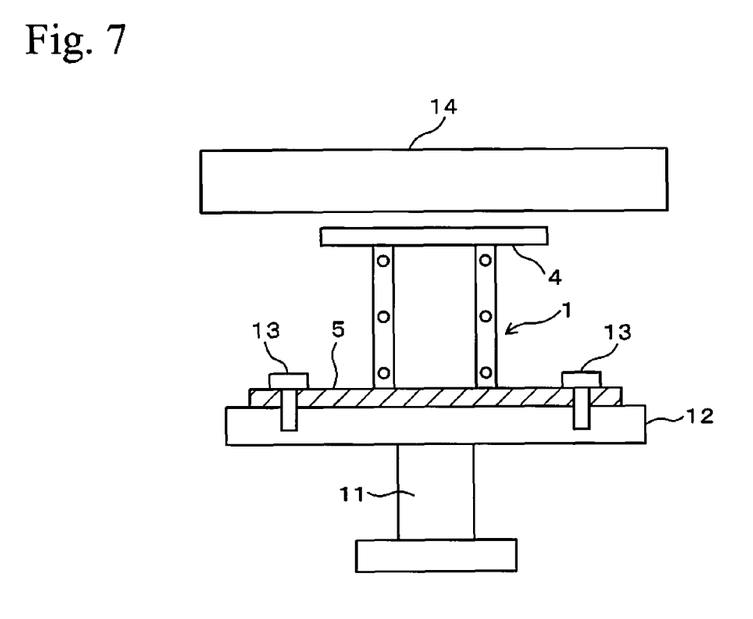
FIG. 7 is a side view showing a crushing test of a cylindrical member using a free-fall type of falling weight testing equipment of the Examples.

With respect to each produced crush test member, crushing tests were carried out. In the crushing test, using a free-fall type of falling weight testing equipment shown in FIG. 7, a method can be used in which four corners of a bottom sheet 5 were fixed to a base sheet 12 supported on a load cell 11, using bolts 13, and thereby standing and supporting the cylindrical member, and then the cylindrical member was crushed downwardly from the upper side by dropping a falling weight 14 from the upper side. The crushing test was carried out under conditions in which the weight of the falling weight 14 was about 100 kg, falling height was 11 m, and falling weight speed in crushing was about 50 km per hour, and a crushing stroke occurred in the cylindrical member (value which subtracted the total length of the cylindrical member after crushing from the total length of the cylindrical member before crushing) and load generated during crushing, were measured. In addition, with respect to each crushing test member, absorbed energy and initial reactive force were measured.

With respect to Examples 1 to 5 and Comparative Examples 1 to 13, results of absorbed energy and initial reactive force in the case in which crushing stroke was 100 mm and separation of welded portion in initial crushing are shown in Table 3. In addition, tensile strength ratios of steel sheets used for hat portion 2 and back sheet 3 which constitute each member are also shown. Each combination of steel sheets of the hat portion 2 and the back sheet 3 and connecting method in these Examples and Comparative Examples differed. Of strength members connecting the developed steel sheet to the hat portion 2 and the comparative steel sheet to the back sheet 3, strength members having tensile strength ratios of 0.3 to 0.85 were Examples, and strength members in which tensile strength deviated from the above range and strength members connecting the same steel sheets to the hat portion 2 and the back sheet 3 were Comparative Examples. With respect to separation of welding portions in initial crushing and crushing mode, a state in which a crushed test member was crushed in a crushing test was recorded using a high-speed video camera which could record at 2,000 frames/second, and judgment was carried out from the record just after the falling weight contacted the test member.

TABLE 3

| | Steel sheet symbols | | Tensile stress ratio of back sheet/hat portion | Member welding method | Crushing properties | | | |
|---|---|---|---|---|---|---|---|---|
| | | | | | Absorbed energy 100 mm kJ | Initial reative force kN | Initial separation of welded portion | Crushing mode |
| | Hat portion 2 | Back sheet 3 | | | | | | |
| Example 1 | Developed steel sheet 1 | Comparative steel sheet 5 | 0.56 | Stitch FSW | 3.86 | 149 | No | Buckling |
| Example 2 | Developed steel sheet 1 | Comparative steel sheet 6 | 0.42 | Stitch FSW | 3.53 | 157 | No | Buckling |
| Example 3 | Developed steel sheet 2 | Developed steel sheet 1 | 0.82 | Stitch FSW | 3.38 | 171 | No | Buckling |
| Example 4 | Developed steel sheet 2 | Comparative steel sheet 5 | 0.46 | Continuos FSW | 4.99 | 200 | No | Buckling |
| Example 5 | Developed steel sheet 2 | Comparative steel sheet 6 | 0.35 | Stitch FSW | 3.62 | 164 | No | Buckling |
| Comparative Example 1 | Developed steel sheet 1 | Comparative steel sheet 2 | 1.20 | Stitch FSW | 2.73 | 115 | No | Breaking |
| Comparative Example 2 | Developed steel sheet 1 | Comparative steel sheet 3 | 0.95 | Stitch FSW | 1.96 | 165 | No | Breaking |
| Comparative Example 3 | Developed steel sheet 2 | Comparative steel sheet 2 | 0.99 | Stitch FSW | 3.01 | 131 | Separated | Breaking |
| Comparative Example 4 | Developed steel sheet 2 | Comparative steel sheet 7 | 0.24 | Stitch FSW | 2.91 | 169 | No | Buckling |

TABLE 3-continued

|  | Steel sheet symbols | | Tensile stress ratio of back sheet/hat portion | Member welding method | Crushing properties | | | |
|---|---|---|---|---|---|---|---|---|
|  | Hat portion 2 | Back sheet 3 | | | Absorbed energy 100 mm kJ | Initial reative force kN | Initial separation of welded portion | Crushing mode |
| Comparative Example 5 | Developed steel sheet 1 | Developed steel sheet 1 | 1.00 | Spot | 2.59 | 146 | No | Buckling |
| Comparative Example 6 | Developed steel sheet 2 | Developed steel sheet 2 | 1.00 | Continuos FSW | 2.39 | 199 | Separated | Breaking |
| Comparative Example 7 | Developed steel sheet 2 | Developed steel sheet 2 | 1.00 | Stitch FSW | 1.83 | 147 | Separated | Breaking |
| Comparative Example 8 | Comparative steel sheet 3 | Comparative steel sheet 6 | 0.44 | Spot | 3.13 | 159 | No | Breaking |
| Comparative Example 9 | Comparative steel sheet 1 | Comparative steel sheet 1 | 1.00 | Spot | 2.65 | 268 | Separated | Breaking |
| Comparative Example 10 | Comparative steel sheet 3 | Comparative steel sheet 3 | 1.00 | Spot | 2.30 | 165 | No | Breaking |
| Comparative Example 11 | Comparative steel sheet 4 | Comparative steel sheet 4 | 1.00 | Spot | 1.98 | 151 | No | Buckling |
| Comparative Example 12 | Comparative steel sheet 5 | Comparative steel sheet 5 | 1.00 | Spot | 1.61 | 129 | No | Buckling |
| Comparative Example 13 | Comparative steel sheet 6 | Comparative steel sheet 6 | 1.00 | Spot | 1.20 | 111 | No | Buckling |

Figure 8:
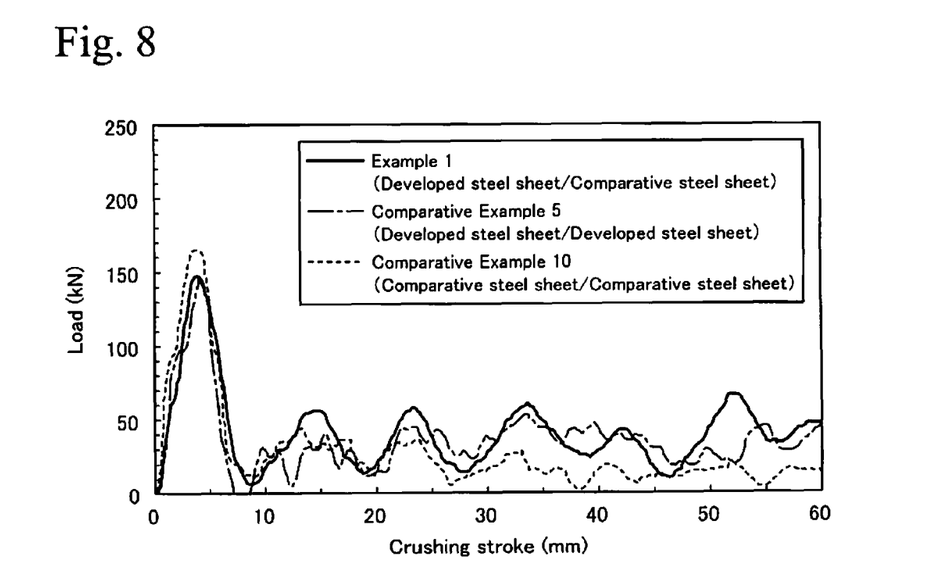
FIG. 8 is a graph showing the relationship between crushing stroke and crushing load measured by performing crushing tests on Examples and Comparative Examples.
Figure 9:
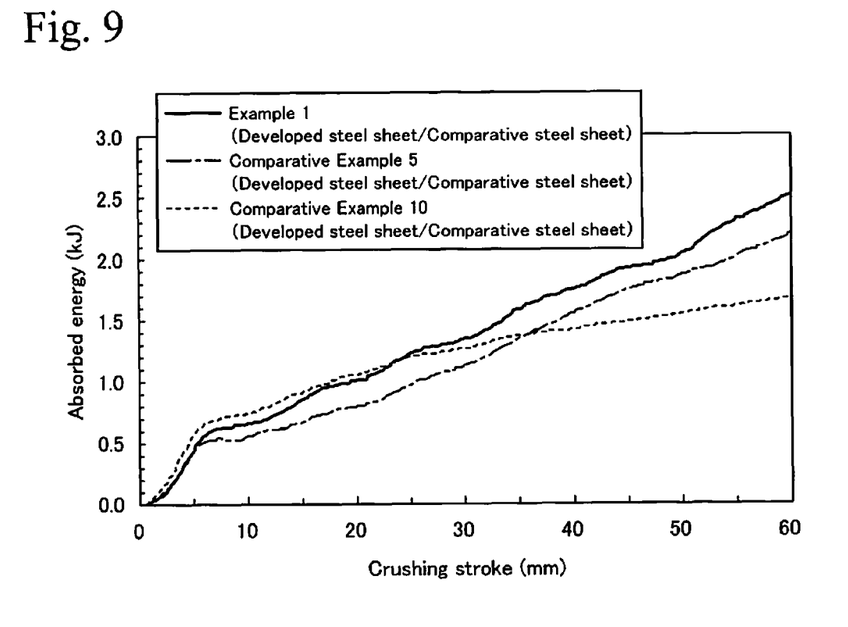
FIG. 9 is a graph showing the relationship between crushing stroke and absorbed energy measured by performing crushing tests on Examples and Comparative Examples.

FIG. 8 shows the relationship between crushing stroke and crushing load measured by the crushing test with respect to Example 1 and Comparative Examples 5 and 10, and FIG. 9, show the relationship between crushing stroke and absorbed energy of these test members. In FIG. 8, initial reactive force in which the load was significantly increased as the crushing stroke was increased to 5 mm was shown, and when the crushing stroke was greater than 5 mm, buckling in a accordion shape of the crushing test member was shown by increasing and decreasing the load which was relatively low.

In FIG. 8, the initial reactive force of Comparative Example 5 was less than that of Comparative Example 10, and in contrast, the load of Comparative Example 5 generated in the case in which the crushing stroke was greater than the value at a peak of the initial reactive force, was greater than that of Comparative Example 10 on average. This reason was because Comparative Example 5, in which the developed steel sheets were connected, absorbed more energy while maintaining lower initial reactive force in comparison with Comparative Example 10 in which the comparative steel sheets were connected. That is, it was shown that the developed steel sheet having high work hardening property had superior ability to absorb crushing energy.

Next, in FIG. 8, the initial reactive force of Example 1 was equivalent to that of Comparative Example 5. In contrast, as is apparent from FIG. 9, the absorbed energy of Example 1 was superior to that of Comparative Example 10. The steel sheets at both hat portions were the same (the developed steel sheet 1); however, the back sheet in Example 1 was the comparative steel sheet and that in Comparative Example 5 was the developed steel sheet, and therefore, difference in strength thereof occurs due to the different constituent materials. Since Comparative Example 5 was inferior in the ability of the steel sheets to follow in crushing to that of Example 1 in which the back sheet was the comparative steel sheet having low strength, the developed steel sheets having high strength were connected. Therefore, it was proven that in the case in which the developed steel sheet having high work hardening property was used for the hat portion which mainly exhibited the ability to absorb crushing energy in crushing, high ability to absorb crushing energy could be obtained by using low strength steel sheet for the back sheet, in order to increase the ability of the steel sheets to follow. Here, a member in which the comparative steel sheet was used for the hat portion and the developed steel sheet was used for the back sheet, was not carried out, since it was supposed that high ability to absorb crushing energy was not obtained, and since the hat portion having large cross section mainly exhibited crushing energy absorbability in crushing.

Figure 10:
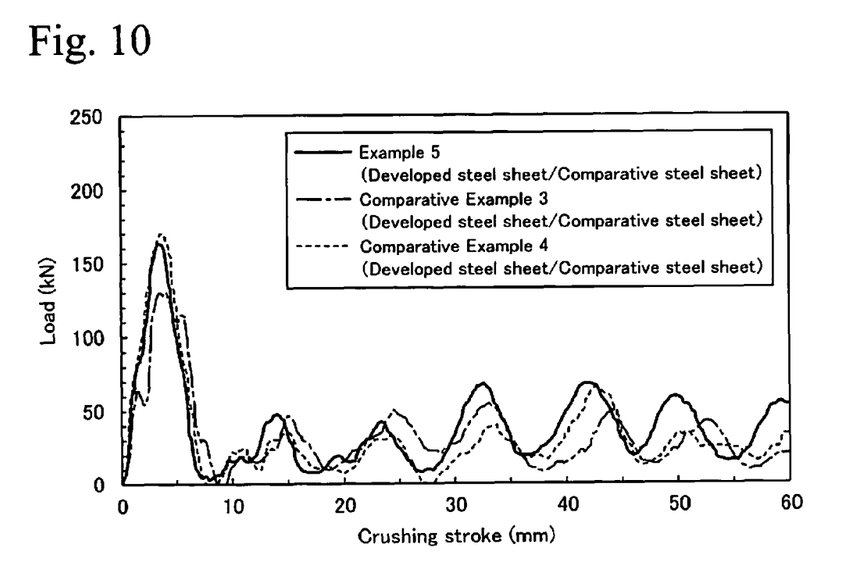
FIG. 10 is a graph showing the relationship between crushing stroke and crushing load measured by performing crushing tests on Examples and Comparative Examples.
Figure 11:
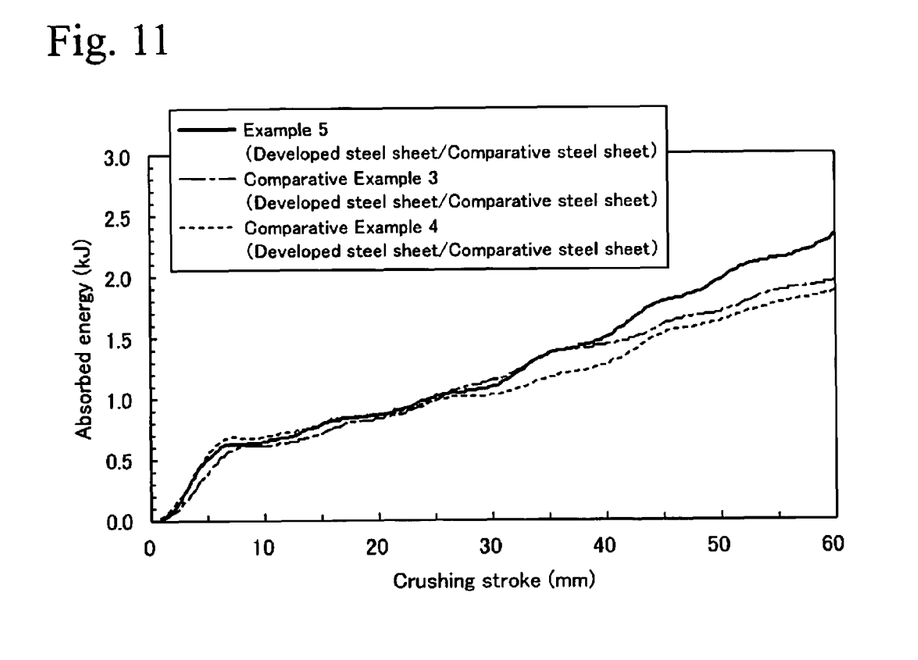
FIG. 11 is a graph showing the relationship between crushing stroke and absorbed energy measured by performing crushing tests on Examples and Comparative Examples.

Furthermore, FIG. 10 shows the relationship between crushing stroke and crushing load measured by performing crushing tests on Example 5 and Comparative Examples 3 and 4, and FIG. 11 shows the relationship between crushing stroke and absorbed energy measured by performing crushing tests on them. These test members were members in which together the comparative steel sheets having different strength were used for the back sheet and the developed steel sheet 2 was used for the hat portion. As is shown in FIG. 10, the initial reactive force of Comparative Example 3 was less than those of the members, and the load was also approximately less after the initial reactive force. This reason was because the ability of the steel sheets to follow in Comparative Example 3 was deteriorated by using the comparative steel sheet 2 having relatively high strength for the back sheet. In addition, as is shown in Tables 1 and 3, in Comparative Example 3, separation of a welded portion occurred in initial crushing, since C equivalent in the comparative steel sheet 2 was high. Furthermore, in FIG. 10, the initial reactive force of Comparative Example 4 was equivalent to that of Example 5, and in contrast, as is apparent from FIG. 11, it was proven that the absorbed energy value of Comparative Example 4 was lower than that of Example 5. This reason was because the ability of the steel sheets to follow in Comparative Example 4 was superior by using the comparative steel sheet 7 having extremely low strength for the back sheet, and the back sheet having extremely low strength did not contribute as a load resistance member in buckling deformation at all. In contrast, Example 5 in which the comparative steel sheet having suitable strength was used for the back sheet had superior ability to absorb crushing energy since the initial reactive force was low and the absorbed energy was high. Therefore, superior ability to absorb crushing energy was not always obtained even by using the developed steel sheet for the hat portion and the comparative steel sheet for the back sheet or by using steel sheet having any strength against the developed steel sheet, and it was necessary that combined comparative steel sheets have an optimum strength range.

Figure 12:
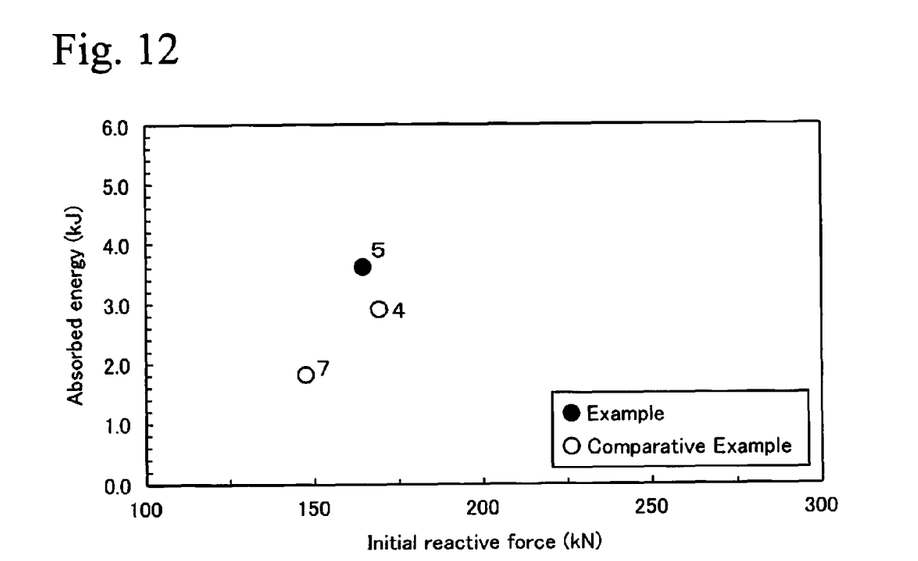
FIG. 12 is a graph showing the relationship between initial reactive force and absorbed energy measured by performing crushing tests on Examples and Comparative Examples.
Figure 13:
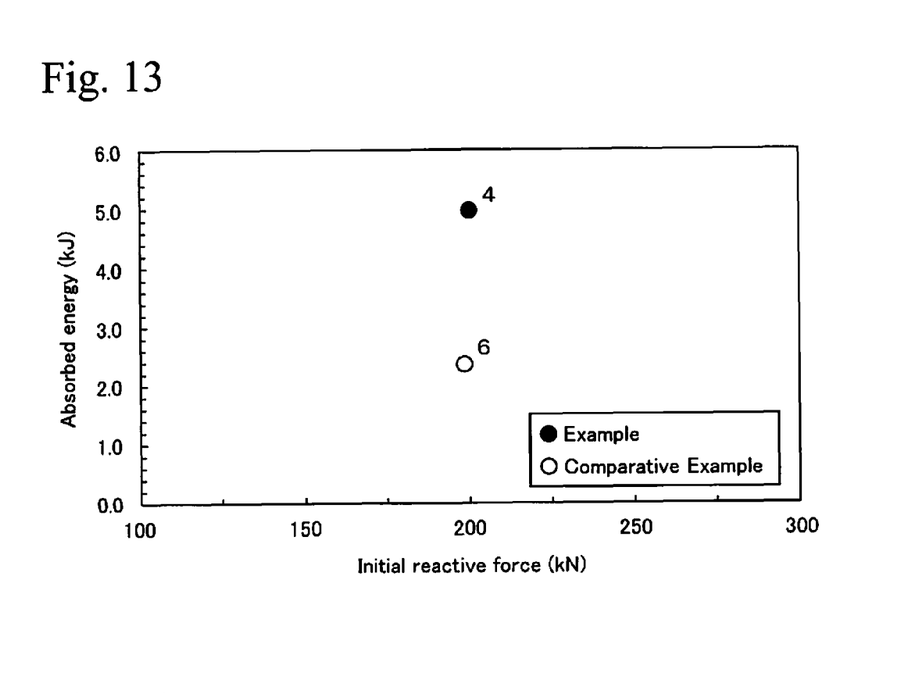
FIG. 13 is a graph showing the relationship between initial reactive force and absorbed energy measured by performing crushing tests on Examples and Comparative Examples.

Next, test members in which the developed steel sheets having relatively high C equivalent were connected in a stitched state using FSW were compared with test members in which the developed steel sheet and the comparative steel sheet were connected in a stitched state by FSW. FIG. 12 shows the relationship between initial reactive force and absorbed energy to the crushing stroke of 100 mm measured by subjecting crushing test to Example 5 and Comparative Examples 4 and 7. As is apparent from FIG. 12, the initial reactive force in Example 5 was equivalent to those in Comparative Examples 4 and 7, and the absorbed energy in Example 5 was higher than those in Comparative Examples 4 and 7. In the developed steel sheet having relatively high C equivalent, sufficient bond strength could be obtained by connecting using FSW; however, the ability of the steel sheets to follow was completely lost, since the steel sheet had high strength. Therefore, separation of the connected portion was generated in initial crushing, and as a result, the absorbed energy of Comparative Example 7 in which the developed steel sheets 2 having high C equivalent were connected was decreased. In contrast, in Example 5, the separation of a welded portion in initial crushing did not occur, and high absorbed energy value was obtained while maintaining the ability of the steel sheets to follow, since the comparative steel sheet was used for the back sheet, even if the developed steel sheet 2 having high C equivalent was used for the hat portion. Therefore, a member having optimum bondability and high ability to absorb crushing energy was obtained by connecting the developed steel sheet having relatively high C equivalent to the comparative steel sheet. However, in the case in which the comparative steel sheet 7 having extremely low strength was used for the back sheet, such as Comparative Example 4, the absorbed energy was inversely reduced, since there was an optimum range in the comparative steel sheet to combine with the developed steel sheet as described above. FIG. 13 shows results of the above comparison with respect to Example 4 and Comparative Example 6 produced by connecting using continuous FSW, and it was proven that continuous FSW showed the same tendency to connect as FSW in a stitched state. Members connected by continuous FSW were considered flanges of the hat portion and the back sheet as an integrated rigid body, and as a result, the absorbed energy value thereof was higher than that of a member connected by FSW in a stitched state.

Figure 14:
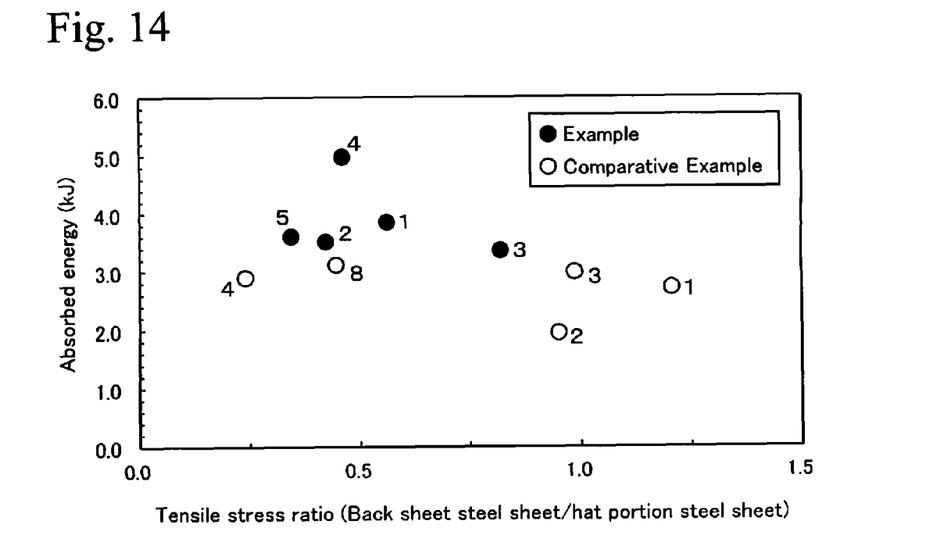
FIG. 14 is a graph showing the relationship between absorbed energy and tensile strength ratio of steel sheets used for a back sheet and a hat portion measured by performing crushing tests on Examples and Comparative Examples.

FIG. 14 shows the relationship between absorbed energy to crushing stroke of 100 mm and tensile strength ratio of steel sheets used for a back sheet and a hat portion measured by performing crushing tests on Examples 1 to 5 and Comparative Examples 1 to 4 and 8. According to FIG. 14, the absorbed energies in Examples 1 to 5 having tensile strength ratios of 0.3 to 0.85 were higher than those of the Comparative Examples and the ability to absorb crushing energy thereof was superior, and it was demonstrated that the absorbed energy value was particularly high, in the case in which the intensity ratio was around 0.5. Therefore, Examples 1 to 5 which connected the developed steel sheet in the present invention and the comparative steel sheet having suitable strength had superior ability to absorb crushing energy according to the improving effect of the ability of the steel sheets to follow.

As explained above, the strength member according to the present invention can realize superior crushing resisting properties, which was not yielded by members using conventional steel sheets, that is, an optimum state which has well-balanced properties of increase of the absorbed energy and suppression of initial reactive force and which has superior connecting ability. Therefore, when the present invention is used for strength members for vehicles such as in a front frame in a car body, etc., the car body can be reduced in weight by shortening the length of the member and kinematic performance can be improved by shortening front overhang, and furthermore, production cost can be reduced by employing the conventional steel sheet.

What is claimed is:

1. A high-strength member for an vehicle, comprising:
   a high-strength steel sheet having not less than 5000 MPa of gradient $d\sigma/d\epsilon$ in a stress-strain diagram in a range of 3 to 7% of true strain obtained in a tension test, and
   a steel sheet having 0.3 to 0.85 of tension strength ratio against tension strength of the high-strength steel sheet,
   wherein the steel sheets are bonded at ends so as to have space extending in a prescribed direction between the steel sheets, and
   wherein a load is to be applied to the member from the prescribed direction when the member is acted upon.

2. The high-strength member for an vehicle according to claim 1, wherein the high-strength steel sheet and the steel sheet are bonded by friction stir welding.

3. The high-strength member for an vehicle according to claim 1, wherein the steel sheet is tabular, and the high-strength steel sheet consists of a flange part bonded with the steel sheet, and a main body part which forms the space by standing up from the flange part in a direction apart from the steel sheet.

4. The high-strength member for an vehicle according to claim 1, the high-strength steel sheet being hat-shaped when viewed from the prescribed direction.

5. The high-strength member for an vehicle according to claim 1, wherein the high-strength steel sheet and the steel sheet are bonded by friction stir welding continuously and linearly.

6. The high-strength member for an vehicle according to claim 1, wherein the high-strength steel sheet and the steel sheet are bonded by friction stir welding intermittently and linearly.

7. The high-strength member for an vehicle according to claim 2, wherein the steel sheet is tabular, and the high-strength steel sheet consists of a flange part bonded with the steel sheet, and a main body part which forms the space by standing up from the flange part in a direction apart from the steel sheet.

8. The high-strength member for an vehicle according to claim 2, the high-strength steel sheet being hat-shaped when viewed from the prescribed direction.

* * * * *